Oct. 20, 1931.  A. H. BLANCHARD  1,828,169
FIRE TRUCK
Filed Oct. 9, 1930  2 Sheets-Sheet 2
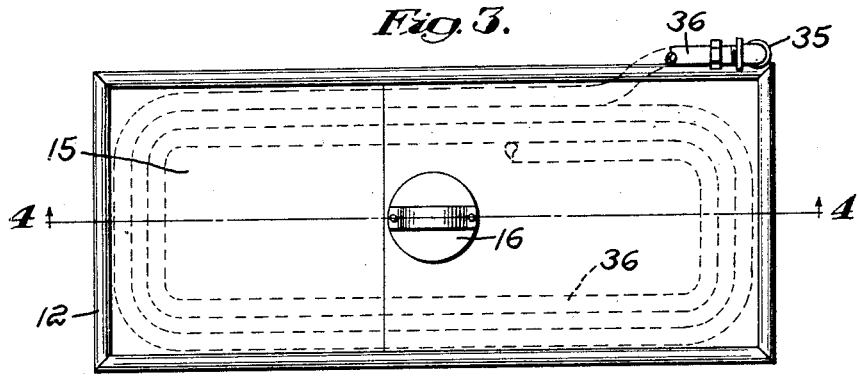
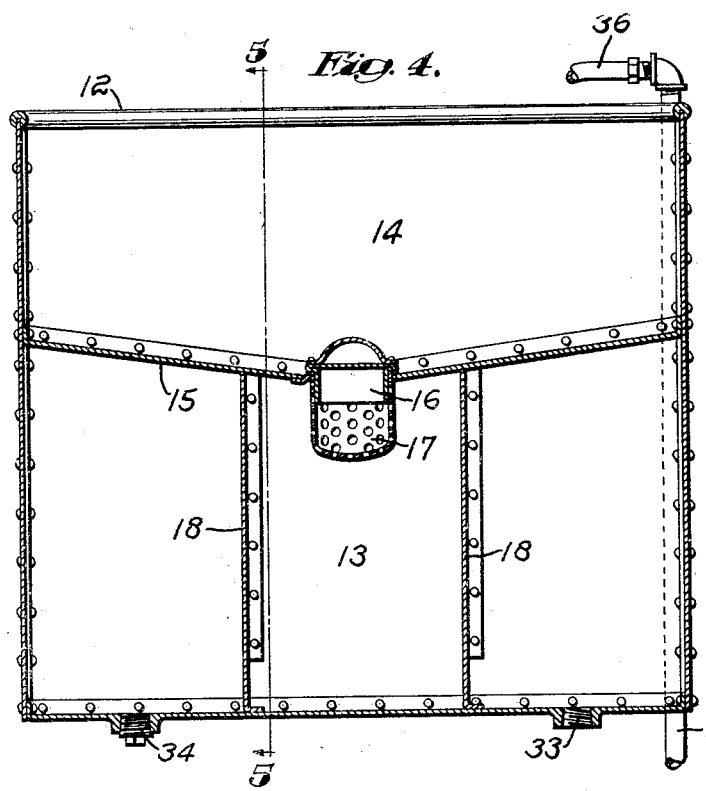
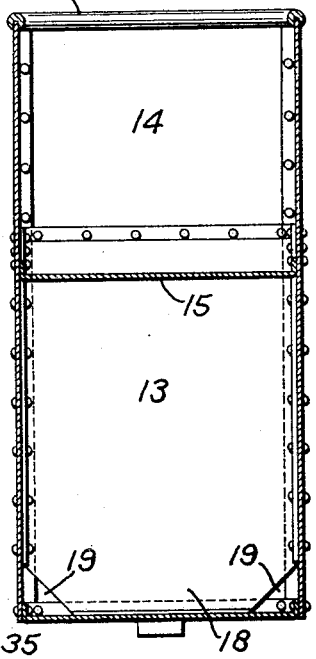
Inventor:
Arthur H. Blanchard,
by Emery, Booth, Varney & Townsend
Attys Patented Oct. 20, 1931

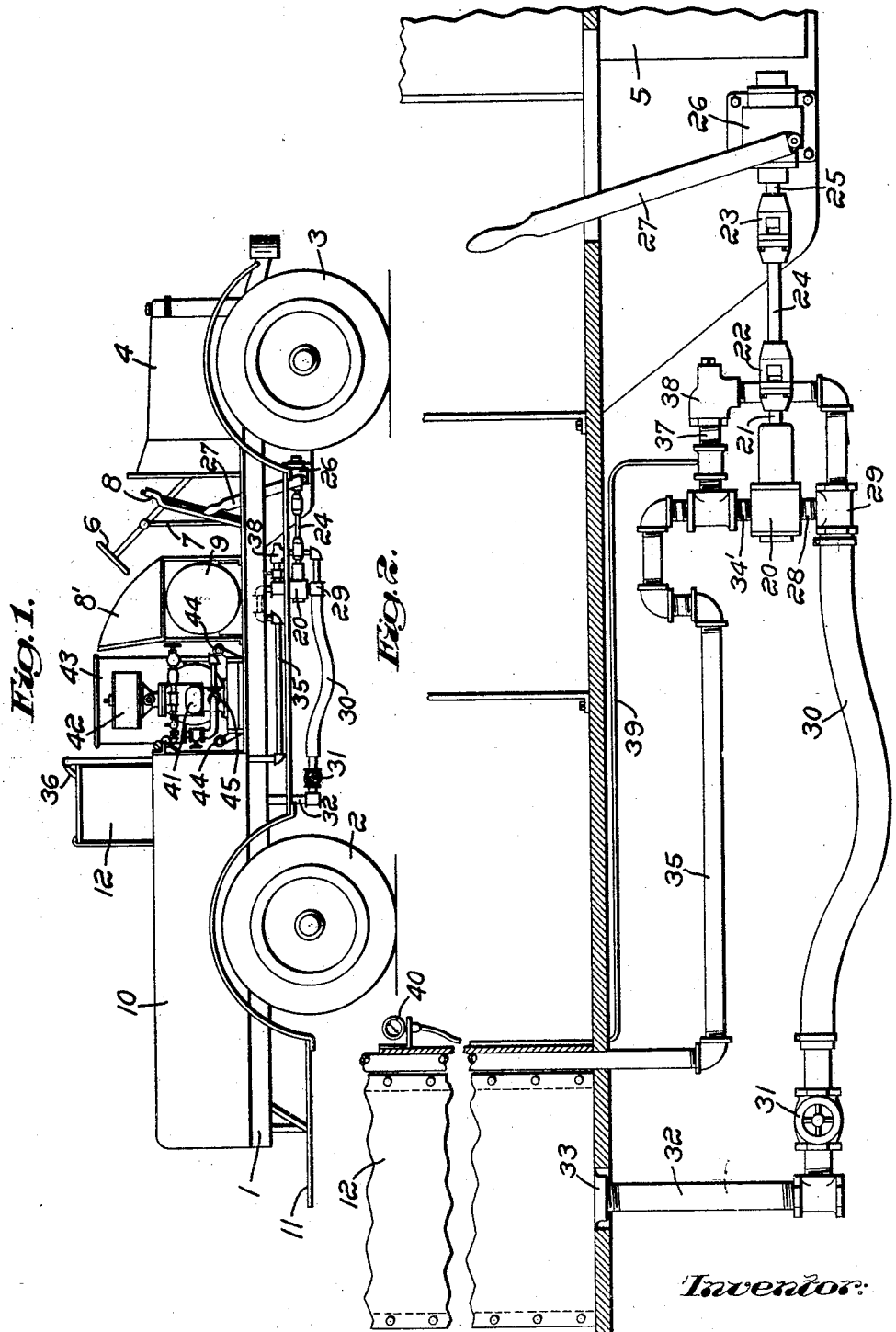

1,828,169

UNITED STATES PATENT OFFICE

ARTHUR H. BLANCHARD, OF ARLINGTON, MASSACHUSETTS

FIRE TRUCK

Application filed October 9, 1930. Serial No. 487,525.

My invention aims to provide a novel fire truck, one particularly adapted for use in extinguishing grass fire, forest fires and fires remote from sources of water supply and inaccessible to usual fire engines.

In the accompanying drawings, which illustrate one illustrative embodiment of my invention, Fig. 1 shows in side elevation a truck equipped in accordance with my invention;

Fig. 2 is a vertical longitudinal detail upon an enlarged scale;

Fig. 3 is a plan view on an enlarged scale of the combined hose carrying basket and filling tank shown in Fig. 1;

Fig. 4 is a vertical, longitudinal section thereof on the dotted line 4—4, Fig. 3; and Fig. 5 is a vertical transverse section on the dotted line 5—5, Fig. 4.

In the particular embodiment of my invention selected for illustration and shown in the drawings, I have employed a usual automobile chassis 1, conveniently a light truck chassis, provided with driving and steering wheels 2 and 3 respectively. This chassis at its front end within the bonnet 4 contains a suitable motor 5, see Fig. 2, connected in usual manner with the rear wheels 2. The usual steering wheel is provided at 6, also the transmission lever 7 and break lever 8 by which to permit and control the operation of the truck.

The driver's seat is conventionally shown at 8', beneath which is placed a suitable gasoline supply tank 9 for the truck motor.

The rear portion of the chassis carries a suitable truck body 10 adapted for storage and carriage of hats, coats and various fire-fighting paraphernalia commonly required by the firemen, and at and about the rear portion of the truck is a step or running board 11.

Within and preferably at the forward end of the body 10 is the supply tank generally indicated by the numeral 12 and shown in detail in Figs. 3 to 5 inclusive, said tank comprising two main compartments, the supply tank proper 13, and above it the combined hose basket and filling tank 14.

The bottom 15 of the basket-filling tank 14 is prferably hopper-like in construction, and at its lowest point is provided with an outlet 16 leading into the supply tank and protected by a screen or sieve 17. The supply tank proper 13 is provided with suitable partitions 18 to restrict movement of any water contained therein from front to back or otherwise, caused by the movement of the truck. These partitions 18, see Fig. 5, are cut away at their lower corners, as indicated at 19, to permit the contents of the tank to flow from end to end thereof past the partitions, the openings so provided being, however, inadequate to pemit objectionable movement resulting from movement of the truck.

Referring to Fig. 1, beneath the chassis frame is suitably hung a rotary pump 20, the shaft 21 of which protrudes at the right and is connected by suitable flexible connections 22 and 23 and an intermediate shaft 24 to the shaft 25 of a transmission gear 26 controlled by the lever 27, which furnishes means by which to drive the pump from the truck motor 5. When the lever 27 is in its rearmost position, as shown in Fig. 2, the truck motor is disconnected from the pump 20, but if said shaft is thrown into its forward position, the transmission 26 is shifted to connect said pump with and to be driven by the truck motor.

The pump 20 takes its water supply through a nipple 28 from the fitting 29, which in turn is connected by a flexible hose 30 with the valve 31, the latter being also connected by the pipe 32 with the supply fitting or opening 33 in the bottom of the tank 13. Said tank is additionally provided with a cleanout plug 34 which, when removed, may furnish also an additional delivery opening for the tank.

At its upper side the pump 20 has an outlet 34' connected with the pipe 35, which rises preferably adjacent the tank 12, see Fig. 1, and has its upper end fitted to receive a hose 36 of suitable length for the service to which the apparatus is to be employed.

This hose would ordinarily be from one hundred feet to two hundred or more feet in length, and my invention contemplates making the filling tank 14 of a shape and size and arranging it in such position as to enable it to serve as a hose basket, in which the long length of hose 36 may be conveniently coiled. Thus the hose, when not in use, is removed from the body 10 of the truck in which all the other miscellaneous paraphernalia is stored, yet such hose is at once readily accessible when required for use.

The pump 20, see Fig. 2, is provided with a by-pass 37 controlled by a suitable check valve 38, through which the water may circulate should the hose be cut off or shut off at any time while the pump is in operation, and from said by-pass in front of the valve 38 leads a small pipe 39 connected with a pressure gauge 40 conveniently arranged for view by the fireman in charge of the truck when the latter is at work.

When awaiting service duty, the supply tank proper 13 is maintained filled with water, preferably to capacity, the outflow being prevented by the closed valve 31.

When the truck is required at a fire, it thus carries a sufficient water supply for instant and effective use without requiring any loss of time to connect the pump with a hydrant or other extraneous source of supply. The fireman in charge has but to open the valve 31, throw the lever 27 to connect the pump 20 with the truck motor, and the hose may be used immediately for extinguishing any incipient or ordinary blaze. In this respect my truck, in its readiness for service and mobility to reach the fire, is the equal of the ordinary chemical engine. Because the pump 20 is capable of projecting a forcible stream larger in diameter and through a longer hose than is possible with the ordinary chemical engine, my apparatus is more effective in extinguishing a fire than is a chemical engine and is free from the resultant damage to property that inevitably accompanies the use of a chemical stream.

While the supply tank 13 is of capacity sufficient to supply immediate requirements, it would not of course last any considerable length of time; it would supply the pump for a period long enough to permit the firemen, by buckets or otherwise, to renew its supply through the basket filling tank 14 above the same.

In practice, upon arriving at a fire, one fireman will be stationed at and to operate the pump, another, or possibly one or two, will reel out the hose and attack the blaze, while another or others, usually two or three, will instantly begin to fill the basket filling tank 14, which will automatically maintain the requisite supply within the supply tank 13, as the level in the latter tends to recede. In practice two or, at the most, three firemen with buckets can keep the filling tank filled sufficiently to maintain the supply tank constantly filled and to supply the stream at the hose nozzle. Ordinarily, the pump 20 would be of a capacity equivalent to and will maintain a sixty foot stream three-eighths of an inch in diameter at the nozzle through from two hundred to three hundred feet of hose, and such a stream can easily be maintained through the convenient arrangement, here provided, by two firemen with buckets.

My invention contemuplates providing the truck with a supplemental pump driven independently of the truck motor 5. Such a supplmental pump is shown placed directly back of the driver's seat and between it and the truck body 10, and is indicated at 41. This pump may be of conventional form and construction, self-contained and driven by a suitable internal combustion engine, and may be placed elsewhere on the truck than in the position here shown if desired. This auxiliary pump carries its own gasoline supply, typified at 42, and is preferably provided with a supply tank, typified at 43, which may be identical with or substantially like the larger tank 12, already referred to.

When the fire is reached, if the pump 20 is found inadequate for immediate needs, the auxiliary pump 41 may be called into play and its supply maintained through the filling tank or compartment to replenish the already filled main supply tank or compartment, just as with the larger pump and its tank. The filling compartment or tank of the auxiliary pump serves as the basket for the hose therefor, just as with the larger one.

For additional flexibility and effectiveness, the auxiliary pump 41 may be made removable and thus made portable independently of and to even a greater extent than the truck 1. To this end said auxiliary pump, the weight of which is alone sufficient to maintain it in its position on the truck while in use if it is desired to use it while upon the truck, is provided with suitable handle bars 44 by which it may be taken by either two or four firemen, according to its weight, and, being a self-contained unit, may be carried within a building or enclosure or to a yard in the rear where the main truck may not readily be moved, or, if the fire be a grass or forest fire, it may be taken into an area of underbrush or woods into which the truck may not enter and deposited by a well or brook or elsewhere for convenient filling of its filling tank, and there operated effectively where no other type of pump or extinguishing apparatus could be employed.

Whether one or both pumps are used upon the truck or whether the auxiliary pump is removed from the truck and conveyed to a remote and otherwise inaccessible point, the combined hose basket and filling tank is a means for maintaining the requisite level within the supply tank and makes practicable and convenient the operation of the pump for any length of time in the effective suppression of a fire.

Should the truck motor 5 fail from any cause, the hose 30 may be disconnected from the fitting 29 and connected to an outlet 45 on the supply end of the auxiliary pump 41 and the latter employed to maintain to the extent of its capacity the stream from the hose 36.

My invention is not limited to the embodiment shown, but may be varied within the scope of the appended claims.

Claims:

1. A fire truck comprising in combination a chassis with its motor to drive the same; a pump and a support therefor on said chasses; a supply tank to which the suction of said pump is connected; a delivery hose for said pump; and an open top combined hose storage basket and filling tank conveniently placed to receive said hose when the latter is not in use, and provided with an outlet at its bottom communicating with said supply tank for renewing the latter when the pump is at work.

2. A fire truck comprising in combination a chassis with its motor to drive the same; a pump and a support therefor on said chassis; means, when desired, to connect the pump with and to be driven by the truck motor; a supply tank to which the suction of said pump is connected; a delivery hose for said pump; and an open top combined hose storage basket and filling tank conveniently placed to receive said hose when the latter is not in use, and provided with an outlet at its bottom communicating with said supply tank for renewing the latter when the pump is at work.

3. A fire truck comprising in combination a chassis with its motor to drive the same; a pump and a support therefor on said chassis; a supply tank to which the suction of said pump is connected and a valve controlling said connection; means detachably to connect said pump, when desired, with and to be operated by said truck motor; a delivery hose for said pump and an automatically controlled by-pass around said pump operated when said hose is obstructed; and an open top combined hose storage basket and filling tank conveniently placed to receive said hose when the latter is not in use, and provided with an outlet at its bottom communicating with said supply tank for renewing the latter when the pump is at work.

4. A fire truck comprising in combination a chassis with its motor to drive the same; a pump and a support therefor on said chassis; a supply tank to which the suction of said pump is connected; a delivery hose for said pump and an open top combined hose basket and filling tank to receive said hose when the latter is not in use, and provided with an outlet at its bottom communicating with said tank and to furnish a filling supply for the latter when the pump is at work; and a second pump mounted on said chassis and driven independently of said truck motor, and means to connect the latter, if and when desired, with said supply tank.

5. A fire truck comprising in combination a chassis with its motor to drive the same; a pump and a support therefor on said chassis; a supply tank to which the suction of said pump is connected; a delivery hose for said pump and an open top combined hose basket and filling tank to receive said hose when the latter is not in use, and provided with an outlet at its bottom communicating with said tank and to furnish a filling supply for the latter when the pump is at work; and a second pump mounted on said chassis and driven independently of said truck motor, and means to connect the latter, if and when desired, with said supply tank, said second pump being readily removable from said chassis and portable, and provided with its own supply and filling tanks.

6. A fire truck comprising in combination a chassis with its motor to drive the same; a pump and a support therefor on said chassis; a supply tank to which the suction of said pump is connected; a delivery hose for said pump and an open top combined hose basket and filling tank to receive said hose when the latter is not in use, and provided with an outlet at its bottom communicating with said tank and to furnish a filling supply for the latter when the pump is at work; and a second pump mounted on said chassis and driven independently of said truck motor, and means to connect the latter, if and when desired, with said supply tank, said second pump having its own delivery hose.

In testimony whereof, I have signed my name to this specification.

ARTHUR H. BLANCHARD.